(12) United States Patent
Hempel et al.

(10) Patent No.: US 12,054,076 B2
(45) Date of Patent: Aug. 6, 2024

(54) METHOD FOR CONNECTING A SPINDLE TO A SPINDLE HOLDING ELEMENT

(71) Applicant: Brose Fahrzeugteile SE & Co. Kommanditgesellschaft, Coburg, Coburg (DE)

(72) Inventors: Eric Hempel, Coburg (DE); Bernd Escher, Lautertal (DE); Bodo Wilk, Rödental (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 704 days.

(21) Appl. No.: 17/262,235

(22) PCT Filed: Jul. 18, 2019

(86) PCT No.: PCT/EP2019/069381
§ 371 (c)(1),
(2) Date: Jan. 22, 2021

(87) PCT Pub. No.: WO2020/020742
PCT Pub. Date: Jan. 30, 2020

(65) Prior Publication Data
US 2021/0300214 A1    Sep. 30, 2021

(30) Foreign Application Priority Data
Jul. 24, 2018   (DE) ..................... 10 2018 212 288.1

(51) Int. Cl.
*B60N 2/06* (2006.01)
*B23K 11/00* (2006.01)
(Continued)

(52) U.S. Cl.
CPC ............ *B60N 2/067* (2013.01); *B23K 11/002* (2013.01); *B23K 11/25* (2013.01); *F16H 25/20* (2013.01); *F16H 2025/2037* (2013.01)

(58) Field of Classification Search
CPC ...... B60N 2/067; B23K 11/002; B23K 11/25; F16H 25/20; F16H 2025/2037
See application file for complete search history.

(56) References Cited

U.S. PATENT DOCUMENTS

| 4,802,374 A * | 2/1989 | Hamelin ............ B60N 2/02246 74/89.32 |
| 6,260,922 B1 | 7/2001 | Frohnhaus et al. |

(Continued)

FOREIGN PATENT DOCUMENTS

| CN | 202115380 U | 1/2012 |
| DE | 1071517 B | 12/1959 |

(Continued)

OTHER PUBLICATIONS

Translation used by the Examiner of DE 100 03 305 (Year: 2001).*

(Continued)

*Primary Examiner* — Monica E Millner
(74) *Attorney, Agent, or Firm* — Dickinson Wright PLLC

(57) ABSTRACT

In a method for connecting a spindle to a spindle holding element in order to produce a longitudinal adjustment device for a vehicle seat, a spindle that extends along a longitudinal axis is connected to an attachment portion of a spindle holding element in a materially bonded manner using a resistance welding method. In this way, a method for connecting a spindle to a spindle holding element in order to produce a longitudinal adjustment device for a vehicle seat is provided, this allowing a firm connection of a spindle to a guide rail via one or more spindle holding elements, with a production process that is easy to manage and to monitor.

16 Claims, 5 Drawing Sheets

(51) Int. Cl.
*B23K 11/25* (2006.01)
*F16H 25/20* (2006.01)

(56) References Cited

U.S. PATENT DOCUMENTS

| | | | | |
|---|---|---|---|---|
| 7,048,244 | B2* | 5/2006 | Hauck | B60N 2/071 |
| | | | | 248/430 |
| 7,437,962 | B2* | 10/2008 | Taubmann | B60N 2/2231 |
| | | | | 74/89.1 |
| 7,571,666 | B2* | 8/2009 | Borbe | B60N 2/929 |
| | | | | 74/606 R |
| 7,669,824 | B2* | 3/2010 | Woehrle | B60N 2/067 |
| | | | | 248/419 |
| 8,469,432 | B2* | 6/2013 | Couasnon | B60N 2/067 |
| | | | | 296/65.13 |
| 9,586,500 | B2* | 3/2017 | Shimizu | B60N 2/0705 |
| 10,137,803 | B2* | 11/2018 | Hoffmann | B60N 2/0715 |
| 10,723,244 | B2* | 7/2020 | Couasnon | B60N 2/067 |
| 2007/0152485 | A1 | 7/2007 | Ehrhardt | |
| 2007/0157751 | A1 | 7/2007 | Woehrle et al. | |
| 2010/0133408 | A1* | 6/2010 | Umezaki | B60N 2/067 |
| | | | | 248/429 |
| 2011/0101194 | A1 | 5/2011 | Wetzig et al. | |
| 2011/0139954 | A1 | 6/2011 | Ruess et al. | |
| 2011/0278875 | A1 | 11/2011 | Couasnon | |
| 2012/0325033 | A1* | 12/2012 | Bosecker | B60N 2/42709 |
| | | | | 74/89.23 |

FOREIGN PATENT DOCUMENTS

| | | |
|---|---|---|
| DE | 19905126 C1 | 8/2000 |
| DE | 19911432 A1 | 9/2000 |
| DE | 10003305 C1 | 6/2001 |
| DE | 10045806 A1 | 4/2002 |
| DE | 10200984 A1 | 7/2003 |
| DE | 10318153 A1 | 12/2004 |
| DE | 202005000317 U1 | 4/2005 |
| DE | 102004001593 B3 | 8/2005 |
| DE | 102006022947 B3 | 9/2007 |
| DE | 102010063044 A1 | 6/2012 |
| DE | 102011004143 A1 | 8/2012 |
| EP | 2730457 A1 | 5/2014 |
| WO | 2011098554 A1 | 8/2011 |
| WO | 2012093002 A1 | 7/2012 |
| WO | 2016150791 A1 | 9/2016 |

OTHER PUBLICATIONS

Fahrenwaldt, Hans J., and Volkmar Schuler. Praxiswissen schweisstechnik: werkstoffe, prozesse, fertigung. Springer-Verlag, 2011.

* cited by examiner

METHOD FOR CONNECTING A SPINDLE TO A SPINDLE HOLDING ELEMENT

CROSS-REFERENCE TO RELATED APPLICATIONS

This application is the U.S. National Phase of PCT Application No. PCT/EP2019/069381 filed Jul. 18, 2019, which claims priority to German Patent Application No. DE 10 2018 212 288.1 filed Jul. 24, 2018, the disclosures of which are hereby incorporated in their entirety by reference herein.

TECHNICAL FIELD

This disclosure relates to a method for connecting a spindle to a spindle holding element in order to produce a longitudinal adjustment device for a vehicle seat.

BACKGROUND

A longitudinal adjustment device is used to adjust a vehicle seat in its longitudinal position in a vehicle. In a longitudinal adjustment device, a vehicle seat, for example, is shiftably arranged relative to a vehicle floor via two guide rail pairs on both sides of the vehicle seat such that by shifting upper rails of the guide rail pairs relative to lower rails of the guide rail pairs the longitudinal position of the vehicle seat can be adjusted.

Such longitudinal adjustment devices may employ a spindle drive in which, in one embodiment, a spindle is stationarily fixed to an associated guide rail and is in threaded engagement with a spindle nut of an adjusting gear unit connected to the other guide rail. When the spindle nut is driven, the spindle nut rotates relative to the spindle and is longitudinally adjusted along the spindle by action of the threaded engagement so that the guide rails are shifted relative to each other.

When connecting the spindle to the associated guide rail, it is to be ensured that even under great loads, in particular in the event of a crash, the spindle is securely retained at the associated guide rail and cannot tear off from the guide rail. The connection of the spindle to the associated guide rail is therefore subject to high strength requirements.

Moreover, the spindle should assume a defined position relative to the associated guide rail and should in particular be retained at a defined height (in the Z-direction), but also in defined longitudinal and transverse positions (in the X- and Y-directions) relative to the guide rail in order to ensure a silent and smoothly running adjustment operation. Despite possibly existing tolerances, the spindle therefore is required to assume a defined position relative to the spindle holding element and, via the spindle holding element, relative to the associated guide rail.

In a longitudinal adjustment device known from DE 10 2004 001 593 B3, a spindle at two ends each is welded to an associated fastening element in the form of a holding bracket and thereby fixed to the fastening elements.

In a longitudinal adjustment device known from WO 2016/150791 A1, a spindle is connected at its ends to an associated guide rail via spindle holders. The spindle holders each include two flanges, between which the spindle is received and which are connected to the spindle by welded joints.

SUMMARY

According to one or more embodiments, the present invention to provides a method for connecting a spindle to a spindle holding element in order to produce a longitudinal adjustment device for a vehicle seat, and a longitudinal adjustment device for a vehicle seat, which provide for a firm connection of a spindle to a guide rail via one or more a spindle holding elements, by using a production process that is easy to manage and to monitor. For example, the spindle is connected to the connecting portion by using a resistance welding method.

Via the spindle holding element, the spindle will be fixed to an associated guide rail of a longitudinal adjustment device such that the spindle is non-rotatably held relative to the guide rail. The spindle here is to be connected to the connecting portion of the spindle holding element such that a positive connection is produced between the spindle and the spindle holding element and thus, the spindle is cohesively fixed relative to the spindle holding element.

To produce the cohesive connection, a resistance welding method is used in which a welding current is conducted between the spindle and the spindle holding element so as to produce a welded joint at the transition between the spindle and the spindle holding element via a current density acting therebetween.

In principle, different resistance welding methods can be used. For example, resistance spot welding can be used, in which a current density is set via approximately point-shaped welding electrodes. Alternatively, resistance projection welding can be used, in which a current density necessary for welding is generated by the geometric shape of the components to be connected to each other. In each case, the spindle and the spindle holding element are held relative to each other by action of a force and are welded to each other using a welding current.

Resistance welding advantageously does not require additional material. In resistance welding, the spindle and the spindle holding element are melted on their sides facing each other so that a cohesive connection is produced between the spindle and the spindle holding element. Here, the spindle settles relative to the spindle holding element, which provides for an easy and advantageous tolerance compensation for a defined position of the spindle relative to the spindle holding element.

The position of the spindle relative to the spindle holding element along the height direction (Z-direction) can be adjusted via the settling behavior of the spindle relative to the spindle holding element during resistance welding. The position of the spindle relative to the spindle holding element in the longitudinal direction (X-direction) and transverse direction (Y-direction) on the other hand can be set by a specified position of the spindle relative to the spindle holding element in the welding tool.

In one embodiment of the method, a first welding electrode is applied to the spindle and a second welding electrode is applied to the spindle holding element. Via the first welding electrode and the second welding electrode, an electric welding current is passed through the spindle and the spindle holding element between the first welding electrode and the second welding electrode so that at the transition between the spindle and the spindle holding element a large current density is obtained, and due to the welding current a welded joint is created at the transition between the spindle and the spindle holding element.

Via the first welding electrode and the second welding electrode, the spindle and the spindle holding element also are pressed against each other with a predetermined pressing force so that the production of the welded joint is effected by action of a force between the spindle and the spindle holding element.

The first welding electrode for example can be applied to a side of the spindle facing away from the spindle holding element. The first welding electrode can have a flat abutment surface for resting against the spindle. It is also conceivable and possible, however, that the first welding electrode is curved in the region of its abutment surface, for example with a semi-circular cross-section (in a cross-sectional plane perpendicular to the longitudinal axis), which is adapted to the outer circumference of the spindle and thus provides for a flat abutment of the first welding electrode at the spindle.

In one embodiment of the method, the second welding electrode for example can be applied to a side of the spindle holding element facing away from the spindle. It is conceivable here to apply the second welding electrode to a side of the connecting portion facing away from the spindle so that the welding current flows through the spindle and the connecting portion between the first welding electrode and the second welding electrode. There is obtained a comparatively short current path. Alternatively, however, it is also conceivable that the second welding electrode is applied to an underside of a fastening portion of the spindle holding element connected to the abutment portion, which faces away from the spindle. The underside of the fastening portion corresponds to the underside of the spindle holding element and serves to connect the spindle holding element to the associated guide rail and in particular to provide a planar abutment at a bottom of the guide rail. In this case, a longer current path of the welding current possibly is obtained. However, an easier process control might be obtained, because via the distance of the welding electrodes to each other the height of the spindle relative to the guide rail can be set in a precise way.

In one embodiment, the distance between the welding electrodes is monitored during welding as a switch-off criterion. The distance between the welding electrodes is connected with the height position of the spindle on the spindle holding element and thus with the height position of the spindle relative to the associated guide rail, when the spindle holding element is fixed to the guide rail. By monitoring the distance between the first welding electrode and the second welding electrode, the spindle thus can be brought into a defined height position relative to the spindle element so that when connecting the spindle holding element to the associated guide rail, the spindle assumes a defined height position relative to the guide rail.

When the first welding electrode for example is applied to the spindle and the second welding electrode is applied to the underside of the fastening portion for fastening the spindle holding element to the guide rail, the distance between the welding electrodes corresponds to the height position of the spindle relative to the associated guide rail, so that by monitoring the distance between the welding electrodes the height position of the spindle relative to the guide rail can be set.

In connection with the process control, for example, the distance between the welding electrodes during resistance welding can be compared with a predetermined distance value, in order to switch off the welding current as soon as the distance between the welding electrodes corresponds to the predetermined distance value. When the predetermined distance value is reached, the welding process hence is terminated. Such a control of the welding process provides for an exact tolerance compensation in particular for the height position of the spindle relative to the spindle holding element and to the associated guide rail.

It is conceivable and possible to use such a control when connecting each spindle to an associated spindle holding element in series production, and thus to control the welding process when producing the connection. However, it is also conceivable and possible to use such a control when performing an initial calibration so as to define a welding time which will then be used in the future series production. The future series production, in which spindles are connected to associated spindle holding elements, then can be effected without process monitoring, i.e., without monitoring the distance between the welding electrodes.

For resistance welding, different parameters can be set in order to influence, via the parameters the quality of the welded joint, its strength. The welding current, for example, can be set to a value between 5 kA and 25 kA, for example, between 10 kA and 20 kA. The pressing force with which the spindle and the spindle holding element are pressed against each other via the welding electrodes can be set, for example, in a range between 100 daN (decanewtons) and 1000 daN, or for example between 400 daN and 900 dN. The current time via which the welding current is applied in the resistance welding method can be set, for example, to a value between 50 ms and 500 ms, or between 100 ms and 300 ms. All values can be set in advance via an internal calibration and material testing. It is also conceivable and possible to vary the process parameters in the welding process in a controlled way, for example, the pressing force and/or the current time in dependence on a control with reference to the distance of the welding electrodes to each other.

The connecting portion of the spindle holding element can be shaped in different ways for a favorable abutment of the spindle at the spindle holding element during resistance welding and for a favorable welded joint. For resistance welding in the manner of resistance projection welding, an approximately linear abutment of the spindle at the connecting portion can exist at the beginning of the welding process so that due to the geometry of the abutment a high current density is obtained at the transition between the spindle and the spindle holding element, and thus a great amount of heat is generated at the transition, and the spindle and the spindle holding element are melted at their transition and welded to each other.

In one embodiment, the connecting portion for example can form a flat bearing surface on which the spindle rests along a (single) line directed parallel to the longitudinal axis of the spindle. This results in a linear support of the spindle relative to the spindle holding element and correspondingly a large current density along the linear support.

In another embodiment, the connecting portion may include a fillet aligned along the longitudinal axis in which the spindle is arranged. There are obtained two lines directed along the longitudinal axis, on which the spindle is supported at the beginning of the process of welding to the connecting portion, and on which a great current density is generated.

In yet another embodiment, the connecting portion can form a pocket with a curved bearing surface, wherein the pocket, for example, is concavely curved and the spindle rests in the pocket. The curvature of the bearing surface can differ from the circumferential curvature of the spindle so that in turn a support of the spindle on the connecting portion is obtained along a line directed parallel to the longitudinal axis.

In a further embodiment, the connecting portion can include a bearing hump to provide a support for the spindle. The bearing hump protrudes from the connecting portion and is directed, for example, transversely to the longitudinal axis so that the longitudinal axis of the spindle intersects with the direction of extension of the bearing hump.

The support of the connecting portion to the spindle in particular defines the place of the highest current density during resistance welding. During resistance welding, the spindle and the spindle holding element are melted at their transition so that the spindle settles to the spindle holding element, for example, up to a value of 25% of the spindle diameter and/or 35% of the material thickness of the connecting portion of the spindle holding element, for example, up to an absolute value of 1.5 mm. After completion of the welding process, a planar connection between the spindle and the spindle holding element is obtained, and thus a planar cohesive connection between the spindle and the spindle holding element.

In one embodiment, the spindle includes a thread for producing a threaded engagement with a spindle nut of an adjusting gear unit of the longitudinal adjustment device. The thread extends circumferentially around the spindle as an external thread and, when the longitudinal adjustment device is mounted, produces a threaded engagement with the spindle nut in such a way that when the spindle nut is rotated relative to the spindle, the spindle nut longitudinally moves along the spindle due to the threaded engagement coupling the spindle nut with the spindle.

The spindle, for example, is connected to the connecting portion at a portion, for example, an end, at which the thread (also) extends. Thus, the spindle can be connected to the connecting portion at a portion at which the thread also is formed. It is not required to provide a cylindrical portion without a thread for connection to the connecting portion, which can substantially facilitate the connection to the connecting portion of the spindle holding element and save costs.

The spindle, for example, can have a diameter between 5 mm and 12 mm, for example between 7 mm and 10 mm. An end of the spindle to be connected to the spindle holding element may include a thread, but alternatively may also be free from a thread. For example, before creating the thread on the spindle, a spindle blank can be connected to an associated spindle holding element.

The connecting portion of the spindle holding element for example can have a material thickness between 2 mm and 10 mm, for example between 3 mm and 9 mm. Both the spindle and the spindle holding element may be fabricated from a steel material.

The object is also achieved by a longitudinal adjustment device including a guide rail, a spindle to be connected to the guide rail, and a spindle holding element for connecting the spindle to the guide rail, wherein the spindle holding element includes a connecting portion to which the spindle is cohesively connected. It is provided that the spindle is connected to the connecting portion via a welded joint produced by using a resistance welding method.

The advantages and advantageous embodiments described above for the method are also applicable analogously to the longitudinal adjustment device, so that in this respect reference is made to what has been explained above.

BRIEF DESCRIPTION OF THE DRAWINGS

The idea underlying the invention will be explained in detail below with reference to the exemplary embodiments illustrated in the Figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
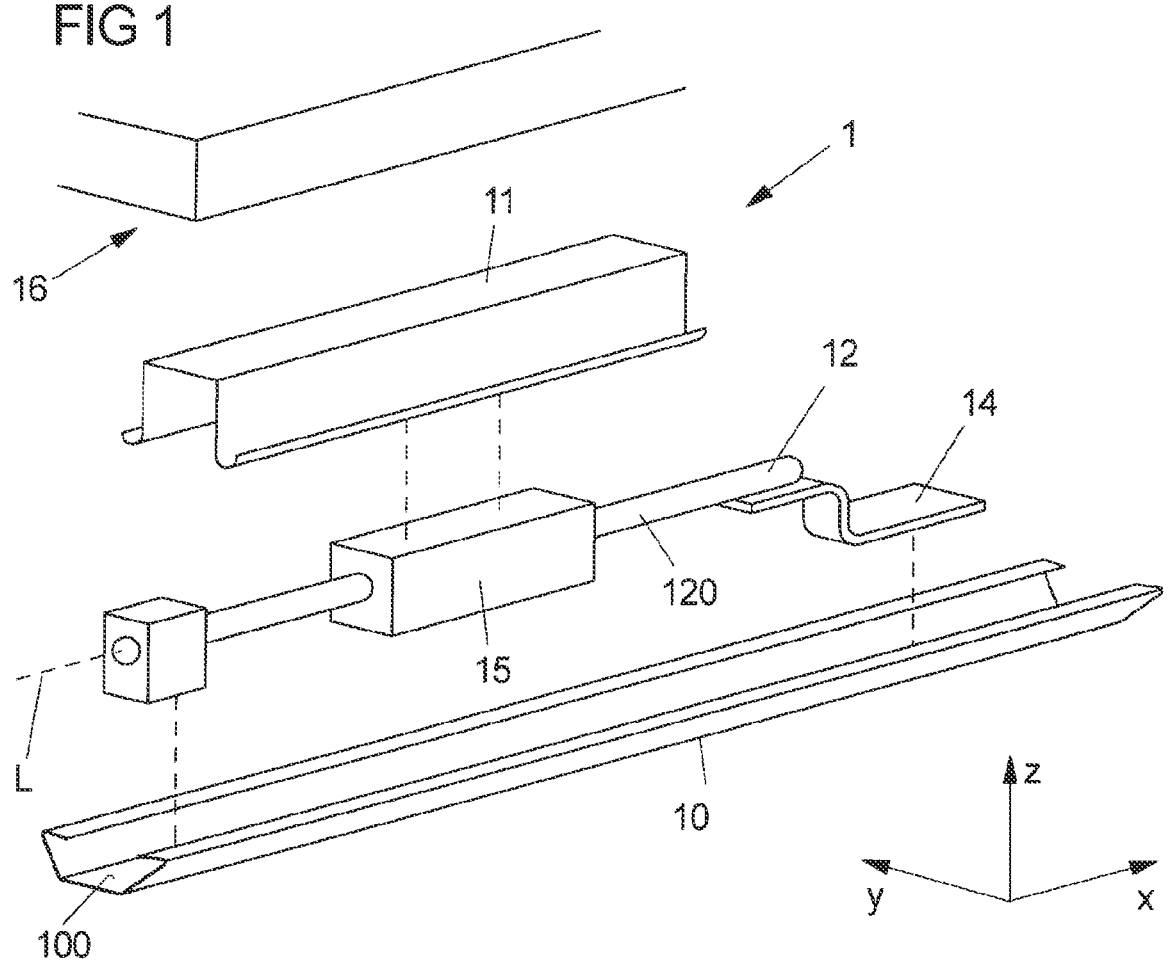
FIG. 1 shows a schematic view of a longitudinal adjustment device for a vehicle seat.

FIG. 1 shows an exemplary embodiment of a longitudinal adjustment device 1 that is used for longitudinally adjusting a vehicle seat 16 along a vehicle longitudinal direction X in a vehicle.

The longitudinal adjustment device 1 may include two guide rail pairs, each formed by guide rails 10, 11, of which an upper guide rail 11 is associated to the vehicle seat 16 and a lower guide rail 10 is associated to the vehicle floor. By longitudinally adjusting the guide rails 10, 11 relative to each other, the longitudinal position of the vehicle seat 16 in the vehicle can be adapted.

The adjustment of the guide rails 10, 11 relative to each other is effected electromotively via a spindle drive, which in the illustrated exemplary embodiment, includes a spindle 12 fixed to the lower guide rail 10 and an adjusting gear unit 15 attached to the upper guide rail 11, for each guide rail pair. The spindle 12 is stationarily and thus non-rotatably held on the lower guide rail 10 via spindle holding elements 13, 14 and includes an external thread 120 via which the spindle 12 is in threaded engagement with a spindle nut of the adjusting gear unit 15 in such a way that by electromotively driving the spindle nut, the same can be put into a rotary movement relative to the spindle 12 and thereby rolls on the spindle 12 via the threaded engagement, so that the adjusting gear unit 15 is longitudinally adjusted relative to the spindle 12 along a longitudinal axis L, along which the spindle 12 is extended, and thus upper guide rail 11 is shifted relative to the lower guide rail 10 along the longitudinal axis L.

In the illustrated exemplary embodiment, the spindle 12 is firmly connected to the lower guide rail 10 via spindle holding elements 13, 14 and therefor fixed to a bottom 100 of the lower guide rail 10 via the spindle holding elements 13, 14.

Figure 2:
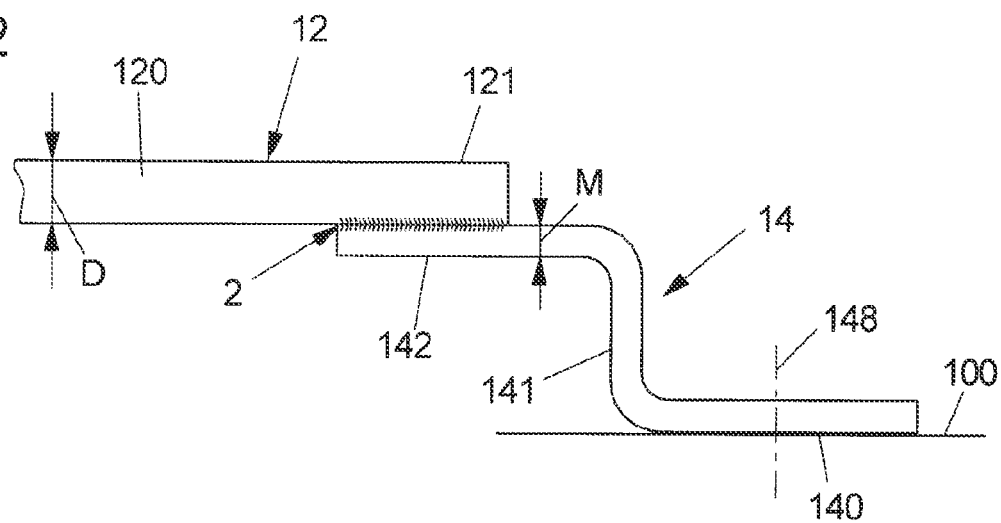
FIG. 2 shows a view of an exemplary embodiment of a spindle in conjunction with a spindle holding element.

While the spindle 12 is screwed for example into the spindle holding element 13 and thereby is connected to the spindle holding element 13, the spindle 12 is cohesively connected to the other spindle holding element 14 via a welded joint 2, as this is schematically shown in FIG. 2. One end 121 of the spindle 12 rests on a connecting portion 142 of the spindle holding element 14 configured as a holding bracket, is cohesively connected to the connecting portion 142 via the welded joint 2, and thus is non-rotatably fixed to the spindle holding element 14. Via a connecting portion 141, the connecting portion 142 is connected to a fastening portion in the form of a flange 140 via which the spindle holding element 14 is applied to the bottom 100 of the guide rail 10 and is connected to the bottom 100 of the guide rail 10 for example by a screw connection 148 (schematically shown in FIG. 2).

Figure 3:
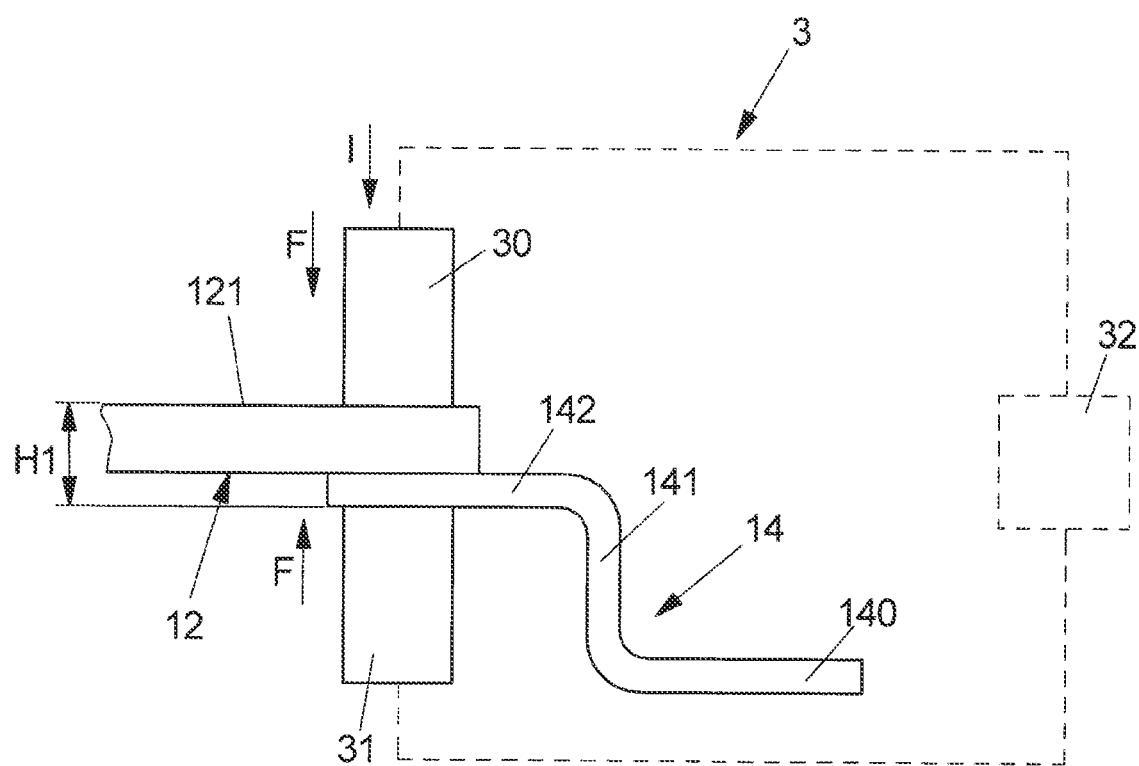
FIG. 3 shows a schematic view of the spindle with the spindle holding element when producing a connection by using a resistance welding method.
Figure 4:
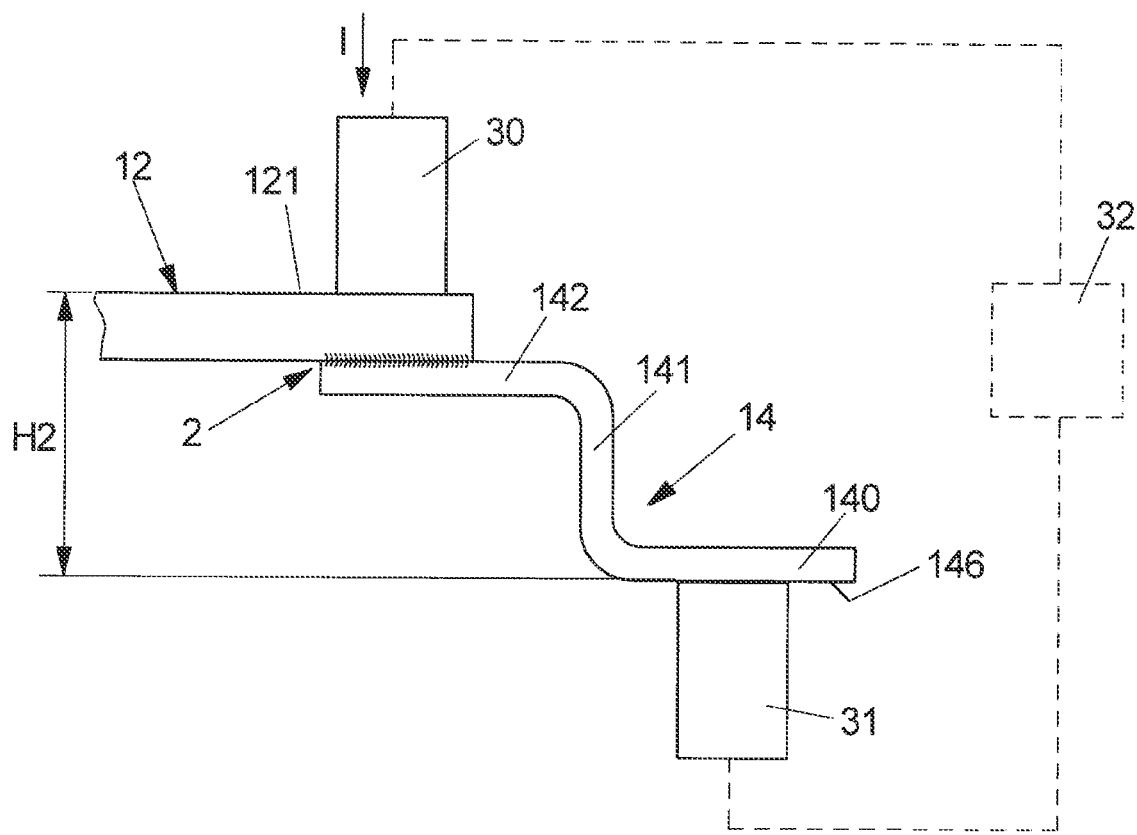
FIG. 4 shows a schematic view of the spindle with the spindle holding element when producing a connection by using a resistance welding method, with another arrangement of welding electrodes.

In accordance with the present disclosure, the welded joint 2 between the spindle 12 and the connecting portion 142 of the spindle holding element 14 is produced by a resistance welding method in which a welding current I is passed through the spindle 12 and the spindle holding element 14 via welding electrodes 30, 31, as this is schematically shown in FIGS. 3 and 4. A first welding electrode 30 rests against the spindle 12, while a second welding electrode 31 on the back of the spindle 12 rests against the connecting portion 142 (in the exemplary embodiment of FIG. 3) or against an underside 146 of the fastening portion 140 of the spindle holding element 14 (in the exemplary embodiment of FIG. 4), which faces away from the spindle 12.

A welding current I is passed through the spindle 12 and the spindle holding element 14 via the welding electrodes 30, 31. At the transition between the spindle 12 and the connecting portion 142 such a large current density is obtained that the spindle 12 and the connecting portion 142 are melted in the region of the transition, and thus a cohesive connection is produced between the spindle 12 and the connecting portion 142.

A pressing force F is applied to the spindle 12 and the spindle holding element 14 via the welding electrodes 30, 31 so that the spindle 12 is pressed against the connecting portion 142, which causes the spindle 12 and the connecting portion 142 to settle towards each other during welding. This allows to compensate tolerances and to set a height position of the spindle 12 relative to the spindle holding element 14 and to the associated guide rail 10 in an exact way.

The welding electrodes 30, 31 are part of a welding device 3 which includes a control device 32 for controlling the welding process. Via the control device 32, the welding current I through the welding electrodes 30 is controlled, and the pressing force F exerted on the spindle 12 and the spindle holding element 14 also is set via the welding electrodes 30, 31.

Via the control device 32, the welding current I may be set to a value between 5 kA and 25 kA, or between 10 kA and 20 kA, or between 13 kA and 18 kA. The pressing force F for example can be set to a value between 100 daN and 1000 daN, between 400 daN and 900 daN, or between 500 daN and 800 daN. The holding time for the pressing force F and also the current time for the welding current I also can be set and controlled via the control device 32.

Figure 5:
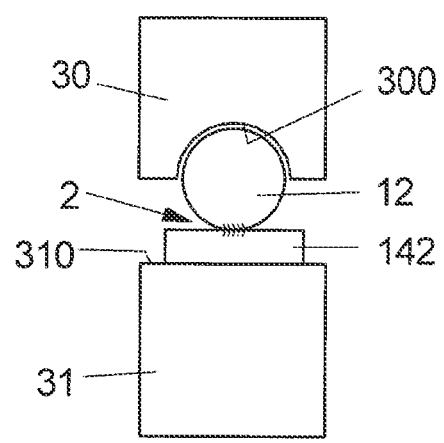
FIG. 5 shows a schematic view of an exemplary configuration of welding electrodes.

Via the welding electrodes 30, 31, the welding current I is fed in such a way that the welding current I flows through the spindle 12 and the spindle holding element 14, and at the transition between the spindle 12 and the connecting portion 142 such a current density is obtained that the spindle 12 and the connecting portion 142 are melted in areas. To effect a favorable current injection, the first welding electrode 30, as shown in FIG. 5, can include an abutment surface 300 which is semi-circularly curved and is adapted in its shape to the shape of the spindle 12 such that a planar abutment can be obtained between the first welding electrode 30 and the spindle 12.

The second welding electrode 31 on the other hand can be configured flat, for example, for a planar abutment at the connecting portion 142 when the connecting portion 142 is designed flat. It is also conceivable and possible, however, to adapt the second welding electrode 31 to the shape (deviating from a flat shape) of the connecting portion 142, when the connecting portion 142 is not designed flat. It is also conceivable and possible that the second welding electrode 31 for example is designed flat for a planar abutment at the underside 146 of the fastening portion 140.

For contact with the spindle 2, the connecting portion 142 can be shaped quite differently, as is shown in different exemplary embodiments in FIGS. 6A, 6B to 9A, 9B. The abutment of the spindle 12 at the connecting portion 142 in particular is important for the production and shape of the welded joint 2, because at the point where the spindle 12 rests against the connecting portion 142 a large current density is obtained and correspondingly the spindle 12 and the connecting portion 142 are melted.

Figure 6A:
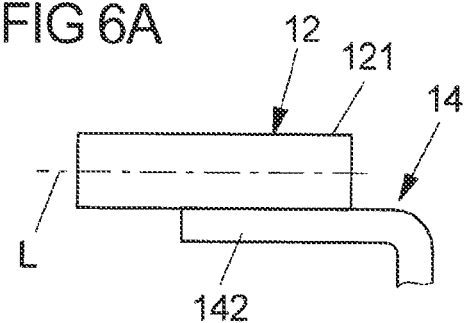
FIG. 6A shows a view of an exemplary embodiment of a connecting portion of the spindle holding element forming a flat bearing surface.
Figure 6B:
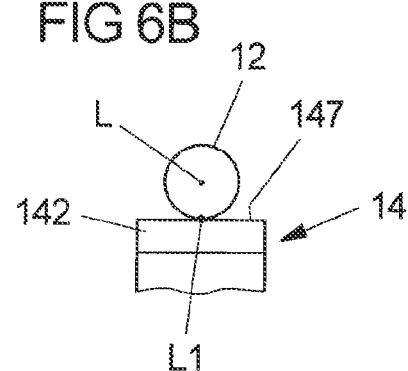
FIG. 6B shows a view of the exemplary embodiment of FIG. 6A, viewed along the longitudinal axis of the spindle.

In the exemplary embodiment of FIGS. 6A, 6B the connecting portion 142 is designed flat. At the beginning of the welding process the spindle 12 rests on a flat bearing surface 147 formed by the connecting portion 142 along a line L1 extended parallel to the longitudinal axis L.

Figure 7A:
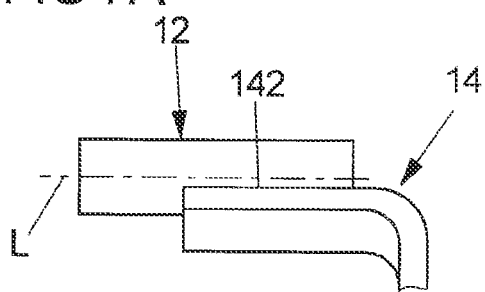
FIG. 7A shows a view of an exemplary embodiment of a connecting portion of the spindle holding element forming a fillet.
Figure 7B:
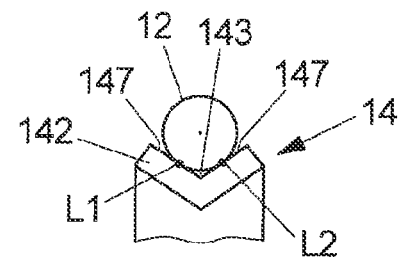
FIG. 7B shows a view of the exemplary embodiment of FIG. 7A, viewed along the longitudinal axis of the spindle.

In the exemplary embodiment of FIGS. 7A, 7B the connecting portion 142 forms a fillet 143, comprising bearing surfaces 147 extended at an angle to each other, on each of which the spindle 12 is supported along a line L1, L2 directed parallel to the longitudinal axis L at the beginning of the welding process.

Figure 8A:
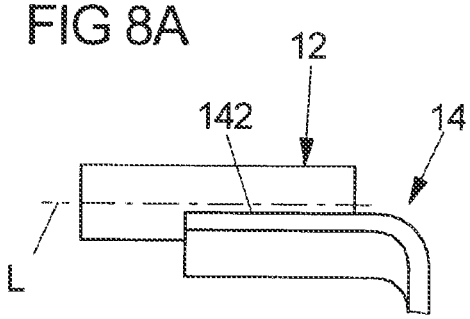
FIG. 8A shows a view of an exemplary embodiment of a connecting portion of the spindle holding element forming a pocket.
Figure 8B:
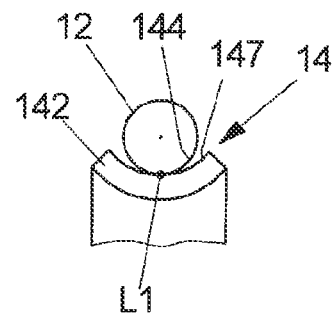
FIG. 8B shows a view of the exemplary embodiment of FIG. 8A, viewed along the longitudinal axis of the spindle.

In an exemplary embodiment of FIGS. 8A, 8B the connecting portion 142 forms a pocket 144 with a curved bearing surface 147, wherein the curvature of the bearing surface 147 deviates from the surface curvature of the spindle 12, and thus in turn a support along a line L1 directed parallel to the longitudinal axis L is obtained.

Figure 9A:
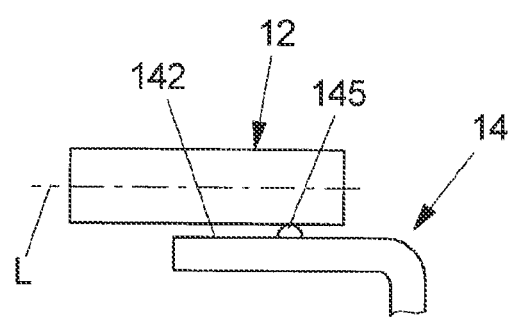
FIG. 9A shows a view of an exemplary embodiment of a connecting portion of the spindle holding element having a bearing hump.
Figure 9B:
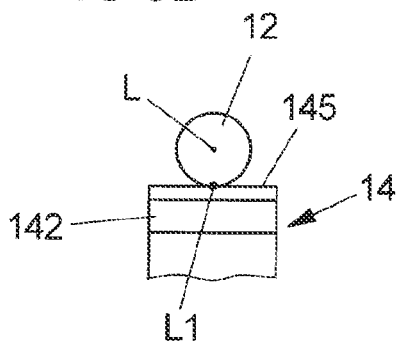
FIG. 9B shows a view of the exemplary embodiment of FIG. 9A, viewed along the longitudinal axis of the spindle.

In the exemplary embodiment of FIGS. 9A, 9B the connecting portion 142 includes a bearing hump 145 which is extended transversely to the longitudinal axis L and on which the spindle 12 rests at the beginning of the welding process, but which is melted during the welding process so that a planar welded joint is obtained between the spindle 12 and the connecting portion 142, with a cross weld in the area of the bearing hump 145.

Figure 10A:
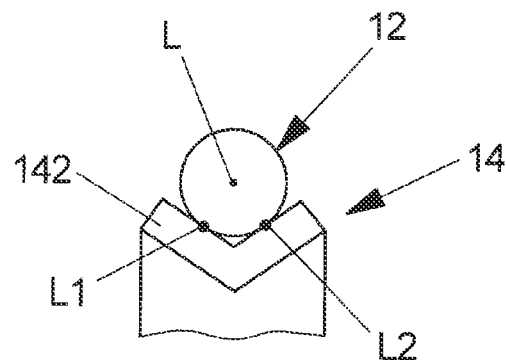
FIG. 10A shows a schematic view of the support of the spindle to the connecting portion of the spindle holding element forming a fillet, before commencement of the welding process.
Figure 10B:
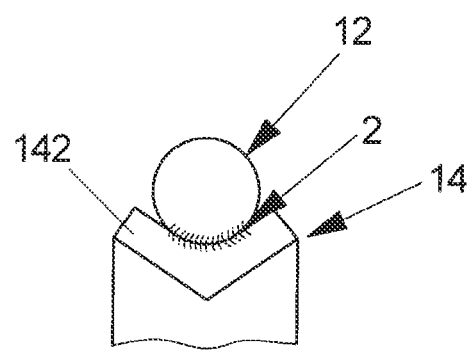
FIG. 10B shows a schematic view of the spindle to the connecting portion, after the welded joint has been produced.

During the welding process, the spindle 12 and the connecting portion 142 are melted at the point where a contact exists so that the spindle 12 and the connecting portion 142 settle towards each other, as this is shown at the transition from FIG. 10A towards FIG. 10B using the example of the fillet-shaped connecting portion 142 of FIGS. 7A, 7B. After producing the welded joint, a flat connection of the spindle 12 to the connecting portion 142 each is obtained in the different configurations of the connecting portion 142 of FIGS. 6A, 6B to 9A, 9B, as can be taken from FIG. 10B, wherein the shape and expansion of the welded joint 2 is dependent on the concrete shape of the connecting portion 142.

The welding connection of the spindle 12 to the connecting portion 142 can be effected in an area of the spindle 12 in which the thread 120 of the spindle 12 extends. The thread 120 can extend up to the end 121 of the spindle 12 at which the spindle 12 is connected to the connecting portion 142. When using the resistance welding method, it is not required to create a cylindrical portion without thread at the end 121 of the spindle 12, which facilitates the connection of the spindle 12 to the connecting portion 142 and possibly saves costs.

Figure 11:
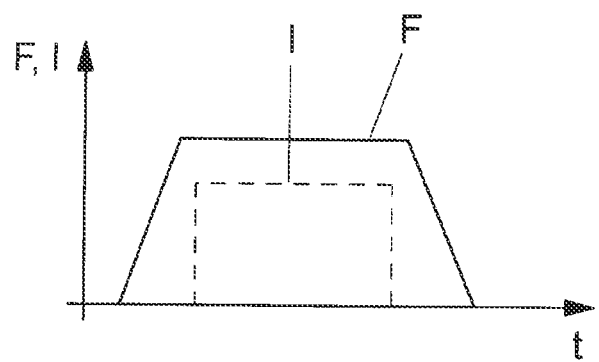
FIG. 11 shows a graphical view of an exemplary course of the pressing force and the welding current over time.

In the welding process, the spindle 12 and the connecting portion 142 are pressed against each other with a pressing force F via the welding electrodes 30, 31, and a welding current I is injected. The holding time for the pressing force F and the current time of the welding current I may not be the same, but the pressing force F can be applied for a longer period of time than the welding current I, as is shown in FIG. 11 by way of example. After switching off the welding current I, the spindle 12 and the connecting portion 142 thus are still pressed against each other with force for a certain time, until the welded joint 2 is hardened.

The welding process can be effected in a controlled way for example in dependence on the distance H1, H2 of the welding electrodes 30, 31 to each other (see FIGS. 3 and 4). For example, the distance of the welding electrodes H1, H2 to each other, which correlates with the height position of the spindle 12 relative to the spindle holding element 14, can be used as a switch-off criterion. When it is detected during welding that the distance H1, H2 of the welding electrodes 30, 31 has reached a predetermined distance value and thus the spindle 12 and the connecting portion 142 have settled to the connecting portion 142 down to a certain height position of the spindle 12, the welding current I can be switched off and the welding process can be terminated.

Such a control can be effected in series production. However, it is also conceivable and possible to use such a control to set process parameters in connection with an initial calibration procedure so as to then carry out the future series production on the basis of the set process parameters without control using the distance H1, H2 of the welding electrodes 30, 31 to each other.

The idea underlying the invention is not limited to the exemplary embodiments described above, but can also be realized in a completely different way.

For example, one spindle holding element or also two spindle holding elements can be connected to the spindle in order to connect the spindle to an associated guide rail using resistance welding as described above. The spindle holding elements can also be designed differently than shown and for example can have a block shape or the like.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 longitudinal adjustment device
10 guide rail (lower rail)
100 bottom
11 guide rail (upper rail)
12 spindle
120 thread
121 end
13 spindle holding element
14 spindle holding element
140 fastening portion
141 connecting portion)
142 connecting portion
143 fillet
144 pocket
145 bearing hump
146 underside
147 bearing surface
148 screw connection
15 adjusting gear unit
16 vehicle seat
2 welded joint
3 welding device
30, 31 welding electrode
300, 310 abutment surface
32 control device
D diameter
F force
H1, H2 height
I current
L longitudinal axis
L1, L2 line
M material thickness While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A method for connecting a spindle that extends along a longitudinal axis to a spindle holding element in order to produce a longitudinal adjustment device for a vehicle seat, wherein the spindle includes a thread configured to engage with a spindle nut of the longitudinal adjustment device, the method comprising:
placing the spindle against a connecting portion of the spindle holding element which form a flat bearing surface by resting the spindle on the connecting portion along a single line directed parallel to the longitudinal axis of the spindle; and
resistance welding the spindle to the connecting portion, wherein the spindle is connected to the connecting portion at a portion that includes the thread and wherein the resistance welding further includes applying a first welding electrode to the spindle and a second welding electrode to the spindle holding element in order to pass an electric welding current through the spindle and the spindle holding element located between the first welding electrode and the second welding electrode so as to produce the welded joint at a transition between the spindle and bearing surface via a current density acting at the line.

2. The method according to claim 1, wherein the first welding electrode is applied to a side of the spindle facing away from the spindle holding element.

3. The method according to claim 1, wherein the first welding electrode has a semi-circularly curved abutment surface for abutment at the spindle and is adapted in its shape to the shape of the spindle such that a planar abutment can be obtained between the first welding electrode and the spindle.

4. The method according to claim 1, wherein the second welding electrode is applied to a side of the spindle holding element facing away from the spindle.

5. The method according to claim 1, wherein the second welding electrode is applied to a side of the connecting portion facing away from the spindle.

6. The method according to claim 1, wherein the second welding electrode is applied to an underside of a fastening portion of the spindle holding element that faces away from the spindle, wherein the fastening portion is configured to attach the spindle holding element to a guide rail of the longitudinal adjustment device.

7. The method according to claim 1 further comprising:
monitoring a distance between the first welding electrode and the second welding electrode; and
switching off the welding current when the distance is less than a predetermined value.

8. The method according to claim 1, wherein the welding current is between 5 and 25 kA.

9. The method according to claim 1 further comprising:
urging the first and second welding electrodes towards each other to apply a pressing force between the spindle and the connecting portion, wherein the pressing force is between 100 daN and 1000 daN.

10. The method according to claim 1, wherein the resistance welding is performed for 50 ms to 500 ms.

11. The method according to claim 1, wherein that the spindle has a diameter between 5 mm and 12 mm.

12. The method according to claim 1, wherein that the connecting portion has a material thickness between 2 mm and 10 mm.

13. A longitudinal adjustment device for a vehicle seat comprising:
a guide rail;
a spindle connectable to the guide rail and extending along a longitudinal axis, wherein the spindle includes a thread configured to engage with a spindle nut of the longitudinal adjustment device; and
a spindle holding element for connecting the spindle to the guide rail, wherein the spindle holding element includes a connecting portion which forms a flat bearing surface configured to cohesively connect to the spindle, wherein the spindle is connected to the connecting portion via a welded joint produced by resistance welding and via a rest of the spindle on the connecting portion along a single line directed parallel to the longitudinal axis of the spindle at a portion that includes the thread, the resistance welding including applying a first welding electrode to the spindle and a second welding electrode to the spindle holding element in order to pass an electric welding current through the spindle and the spindle holding element located between the first welding electrode and the second welding electrode so as to produce the welded joint at a transition between the spindle and the bearing surface via a current density acting at the line.

14. The longitudinal adjustment device according to claim 13, wherein the connection portion has a semi-circular cross-section to define a pocket, and the spindle is disposed in the pocket.

15. The longitudinal adjustment device according to claim 13, wherein the connecting portion includes a filleted bearing surface that extends parallel to the longitudinal axis, and the spindle is disposed on the filleted bearing surface.

16. The longitudinal adjustment device according to claim 13, wherein the connecting portion defines a pocket having a bearing surface, and the spindle is disposed on the bearing surface.

* * * * *